United States Patent [19]

Ika

[11] Patent Number: 5,167,674
[45] Date of Patent: Dec. 1, 1992

[54] BISMALEIMIDE-TRIAZINE RESIN BONDED SUPERABRASIVE WHEELS

[75] Inventor: Prasad V. Ika, Shrewsbury, Mass.

[73] Assignee: Norton Company, Worcester, Mass.

[21] Appl. No.: 867,942

[22] Filed: Apr. 13, 1992

[51] Int. Cl.$^5$ ............................................. C09K 3/14
[52] U.S. Cl. ...................................... 51/298; 51/295; 51/309; 526/262; 544/7
[58] Field of Search ................... 51/295, 298, 309; 526/262; 544/3,7

[56] References Cited

U.S. PATENT DOCUMENTS

| | | | |
|---|---|---|---|
| 4,107,125 | 8/1978 | Lovejoy | 51/298 |
| 4,126,276 | 11/1978 | Manfroy et al. | 51/298 |
| 4,126,428 | 11/1978 | Rude | 51/295 |
| 4,142,870 | 3/1979 | Lovejoy | 51/298 |
| 4,221,572 | 9/1980 | Torimae et al. | 51/298 |
| 4,314,827 | 2/1982 | Leitheiser et al. | 51/309 |
| 4,369,046 | 1/1983 | Bruschek et al. | 51/298 |
| 4,623,364 | 11/1986 | Cottringer et al. | 51/309 |

*Primary Examiner*—Shrive Beck
*Assistant Examiner*—Willie J. Thompson
*Attorney, Agent, or Firm*—Arthur A. Loiselle, Jr.

[57] ABSTRACT

An improved superabrasive composition for grinding applications comprising a superabrasive material, a bismaleimide-triazine addition copolymer resin which as a cured polymer exhibits (i) a glass transition temperature (Tg) of at least about 280° C. and (ii) a long term thermal resistance of at least about 180° C., a free radical generating initiator, and preferably a catalyst, is disclosed. The superabrasive abrasive composition is particularly useful as a cutting edge in a high performance cutting wheel.

31 Claims, No Drawings

BISMALEIMIDE-TRIAZINE RESIN BONDED SUPERABRASIVE WHEELS

FIELD OF THE INVENTION

The present invention is directed to an improved super-abrasive wheel wherein the grinding portion or rim of the wheel comprises a superabrasive material and particular bismaleimide-triazine resins.

BACKGROUND OF THE INVENTION

Grinding wheels of various shapes, sizes, and composition are well known in the art. Wheels containing superabrasive materials such as diamond or cubic boron nitride (CBN) in the grinding edge of the wheel are specialty wheels used in certain commercial processes. For example, such superabrasive wheels are used in cutting operations including dicing, slicing, scribing, slotting and squaring in the processing of silicon wafers in the electronics industry. Superabrasive cutting wheels are used to perform these cutting operations on hard alumina coatings on such wafers. To avoid thermal and mechanical stress or damage to the circuit, cutting operations are performed using superabrasive cutting wheels at a slow rate. One of the principal costs involved in the production of such circuits is the cutting operation including the time and costs of replacing worn wheels.

Accordingly, an effort has been made to improve the grinding performance of superabrasive wheels by increasing their wear resistance and grinding ability. Such efforts have been concentrated in the area of compositional changes including adding fillers, using various combinations of superabrasives and changing the bonding agents. Examples of suitable bonding agents that have been employed include phenolic resins, epoxy resins, polyester resins, shellac, polyimide and rubber. Phenolic resins are presently the most widely used polymeric bonding agents for superabrasive wheels.

Recently, CA 107(24):221,932k, 1991 reported the use of a polyaminobismaleimide resin as an improved bonding agent for diamond wheels used in the polishing of ceramics.

A cutting wheel containing Borazon ® II cubic boron nitride of General Electric and N,N'-(p,p'-methylenediphenylene)bismaleimide-p,p'-methylenedianiline copolymer is disclosed as being useful for the dry cutting of tool steel. See CA 78(20):125,612t.

Japanese Patent Application No. 77044078 discloses a diamond wheel containing a mixture of specific polyoxybenzoyl resins and polybismaleimide resins in combination with a carbon fiber or solid lubricant such as molybdenum disulphide or graphite.

While grinding wheels offering improved efficiency have been produced, there is still room for further improvement in grinding rate and/or cutting rate and/or efficiency.

Accordingly, it is an object of the present invention to prepare a high precision superabrasive wheel having an improved grinding or cutting rate and with high grinding or cutting efficiency so as to use the same or less power, thereby reducing processing costs.

It is another object of the present invention to design a superabrasive wheel with superior wear resistance.

DISCLOSURE OF THE INVENTION

It has now been found that a wheel having a grinding portion or cutting surface formed of a superabrasive composition comprising a superabrasive material such as cubic boron nitride, a bismaleimide-triazine resin bonding agent, a free radical generating initiator, and preferably a catalyst for controlling the curing reaction of the resin, is highly efficient and has excellent wear resistance. The superabrasive composition may also contain conventionally suitable filler materials and other cutting aids as well as a second abrasive of the non-superabrasive type such as the sol gel type sintered alumina based abrasive, examples of which are described in U.S. Pat. No. 4,623,364 and U.S. Pat. No. 4,314,827. As used herein, the term "grinding wheel" also includes cutting wheel.

The bismaleimide-triazine resin used is a highly heat resistant thermosetting addition polymerization resin. To produce a superior wear resistant superabrasive wheel, such copolymer resins need to exhibit, as cured polymers, a glass transition temperature (Tg) of at least about 280° C. and a long term thermal resistance of at least about 180° C.

A wheel having a grinding portion or cutting surface composed of the superabrasive composition described herein has been shown to have superior wear resistance and efficiency when compared to conventional phenolic bonded compositions and other bis-maleimide bonded compositions.

DETAILED DESCRIPTION OF THE PREFERRED EMBODIMENTS

The wheel of the present invention generally comprises a conventional core or inner section and an annular or outer grinding portion/cutting edge. The outer portion comprises an improved superabrasive composition generally comprising a superabrasive material, a bisemaleimide-triazine addition polymer resin, an initiator, and preferably an accelerating catalyst for curing (crosslinking) the resin at temperatures below about 220° C. within about 75 minutes. The relatively rapid relatively low temperature cure has been found advantageous in producing the superior wheels of this invention.

The superabrasive material may be selected from any suitable superabrasive material known in the art. A superabrasive material is one having a Knoop hardness of at least about 3000 kg/mm$^2$, preferably at least about 4200 kg/mm$^2$. Such materials include diamond, cubic boron nitride (CBN), and mixtures thereof. The superabrasive material is generally of a grit size of from about 60 grit to 0.5 micron, more preferably of from about 80 grit to 600 grit. Optionally, the superabrasive material may be provided with a thin metal coating such as nickel, copper, titanium, or any wear resistant or conductive metal which can be deposited on the super abrasive crystal. With diamond and CBN superabrasive materials, a thin nickel coating is currently preferred. Such coated superabrasive CBN materials are commercially available from a variety of sources such as General Electric under the trade name Borazon Type 1, De Beers under the trade name ABN 360, and Showa Denko under the trade name SBN-DN.

The superabrasive material is generally present in an amount of from about 5 to 40% by volume of the composition, more preferably from about 10 to 25 % by volume.

The bisemaleimide-triazine resin is effectively a crosslinked addition copolymer made up of bismaleimide and a triazine resin. It is prepared by the reaction of a bismaleimide compound and a dicyanate compound which are capable of reacting to form several different internal structures (I, II, III, and IV) as appear in the model reaction scheme below:

between the cyanate groups. Such compounds are of the general formula:

$$Nc-O-S-O-CN$$

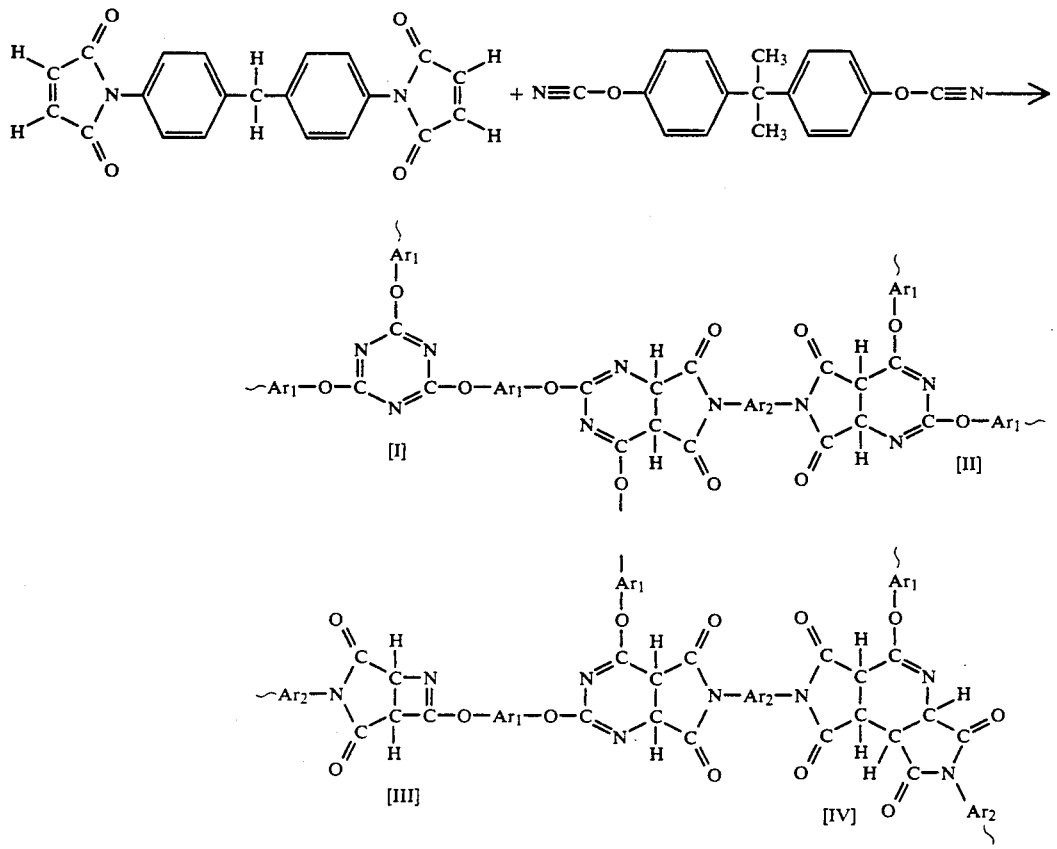

Suitable copolymer resins for use herein are those which exhibit, as cured polymers, both (i) a glass transition temperature (Tg) of at least about 280° C., preferably at least about 300° C. and (ii) a long term, i.e. greater than about 5 minutes thermal resistance of at least about 180° C., preferably at least about 200° C. These resins may be manufactured by conventional techniques well known in the art.

Suitable bismaleimide compounds useful for preparing the copolymer resins are of the general formula:

$$Ma-Q-Ma$$

wherein Ma is a maleimide group ($C_4O_2H_2N$) bonded through the nitrogen atom of the cyanate group of the other monomer, and Q one aromatic ring. More preferably Q is of the general structure:

$$-Ar-R-Ar-$$

wherein Ar is an aromatic ring and R is either a bond, a methylene group ($CH_2$) or an alkyl group containing from about 2 t 12 carbon atoms. The Ar or R groups may be substituted by other elements and or groups if desired, but no substantial benefit from so doing is expected. More preferably R is methylene or $C(CH_3)_2$.

Suitable cyanates useful for forming the triazine portion of the cured copolymer resins are predominantly dicyanates although monocyanates may also be present. Preferably such compounds include an aromatic ring wherein S is a difunctional organic group which includes at least one aromatic ring. Preferably S is a group such as:

$$-Ar-R-Ar-$$

wherein Ar is an aromatic ring and R is either a bond, a methylene group ($CH_2$) or an alkyl group containing from about 2 to 12 carbon atoms. The Ar or R groups may be substituted by other elements and or groups if desired, but no substantial benefit from so doing is expected. More preferably R is methylene or $C(CH_3)_2$.

The bismaleimide-triazine resins contain active functional groups with an unsaturated double bond which allows the further incorporation of additional monomers and resins. Specifically, the resins can combine with phenolic resins, epoxy resins (diglycidyl ether of bisphenol A), polyimides (both thermoplastic and thermoset), polybenzimidazoles, and the like. The term "bismaleimide-triazine resin" is utilized herein to include the products produced from such further incorporation as well as the basic resins per se.

Commercially available bismaleimide-triazine resins include the BT Resins manufactured by Mitsubishi Gas Chemical Co. BT Resin Nos. BT 4680, BT 2680, BT 2610, BT 2532F are within the definition of the bismaleimide-triazine resins which are useful herein. BT 4680 resin is presently the most preferred resin.

The bismaleimide-triazine resin is present in the super-abrasive composition of the present invention in an amount of from about 35 to 60 vol % of the composition, more preferably in amount of from about 45, to 55 vol %, and most preferably of from about 49 to 53.5 vol %.

In order for the bismaleimide-triazine resin to adequately and sufficiently cure in a controlled manner, an initiator should be utilized. The initiator may be any free radical generating material well known in the art. The preferred free radical producers include both conventional peroxide and azo polymerization initiators. They may be used either individually or in combinations and generally in an amount of about 0.01 to 1% by weight of the total resin. Suitable peroxides include dicumyl peroxide, benzoyl peroxide, diethyl peroxide, di-t-butyl peroxide, and the like. A suitable azo polymerization initiator is azobisisobutyronitrile. The currently preferred initiator is dicumyl peroxide.

Preferably, an accelerating catalyst will be used in combination with the initiator. Examples of suitable catalysts include organic metal salts as well as amines. It is presently preferred to employ an initiator and catalyst system which causes the resin to have a long gel time at a low temperature and a short gel time at a high temperature. Examples of the organic metal salts that may be employed include zinc octoate and ferric acetyl acetonate while suitable amines include triethylene diamine and N,N-dimethylbenzylamine. When a catalyst is used it will generally be present in an amount of from about 0.01 to 1 % by weight of the resin. Preferably the catalyst is present in an amount of about 0.2-0.5 wt %.

It is also preferable to incorporate a material which can absorb any moisture which may be present in the composition before curing of the resin. The preferred material is lime (calcium oxide). Suitable amounts of such materials are generally of about 1 to 5 vol %, preferably about 1.5 to 3 vol %.

Although not required, the superabrasive composition may also contain conventional filler materials. There are basically two types of fillers: active fillers and inactive fillers. The former, also referred to as cutting aids, include such materials as molybdenum dissulfide, polytetrafluoroethylene, sodium hexafluorosilicate, graphite, nickel powder, cryolite, iron disulfide, calcium fluoride, tin, copper, magnesia, potassium sulfate, potassium fluorate, and the like. These materials are believed in some cases to react with the substance being ground or cut while in other cases the additive functions as a lubricant. The inactive fillers include such materials as reinforcing fibers, silicon carbide, fine fused alumina, and fine sintered alumina including those sintered aluminas produced by the sol gel method of U.S. Pat. No. 4,314,827 and the seeded sol gel sintered abrasives produced by the methods disclosed in U.S. Pat. Nos. 4,623,364 and 4,744,802, each of which is incorporated herein by reference. Solid filler particles are generally substantially finer than the particle size of the abrasive grits. When the solid filler particles are of similar size to the abrasive grits, the fillers often function as a secondary abrasive as pointed out above. All of the foregoing is well known to those skilled in the art and further explanation thereof is available in the literature. The filler materials are generally present in an amount of from about 20 to 40 vol % of the composition, more preferably in an amount of from about 25 to 35%, and most preferably in an amount of from about 27 to 30%.

The wheels produced according to the present invention are composed of a preform or core section and an annular grinding or cutting section composed of the superabrasive composition described herein. The wheels may be produced by conventional techniques known in the art. For example, the preform or core section is first molded. It is composed of materials well known in the art such as aluminum, phenolic resin, steel, copper, combinations of aluminum powder and phenolic resin, and the like. The superabrasive composition is then prepared by mixing together the components of the composition (the bond components and the superabrasive materials) and screening the mixture to more thoroughly blend the ingredients and remove any coarse particles or large agglomerates.

The outer surface of the preform is coated with a fluid cement composition, preferably a phenolic cement, to cause adhesion of the superabrasive composition to the preform. The coated preform is placed into a mold and the superabrasive mixture is placed about the periphery of the preform. The superabrasive mixture is then compressed and held under pressure for sufficient time and at a sufficient temperature to initiate the curing reaction and substantially crosslink the resin in the composition. Suitable pressures are generally of from about 1 to 4 TSI (tons per square inch), preferably of from about 1.5 to 2.5 TSI. Temperatures which effect curing are generally greater than about 200° C. preferably from about 200° to 220° C.

Once the wheel is cooled, the edges are deburred and examined for chips, cracks and porosity, and stripping damage. Wheels without defects and with very low porosity (as determined visually after soaking the wheel in a solution) are then baked, preferably at a predesigned incremental bake cycle at varying temperatures for different time periods depending upon the specific bond composition. Suitable temperatures and bake cycles include temperatures in the range of up to about 210.C. and times of up to a total of about 40 hours. Such incremental bake schedules are known in the grinding wheel industry and routine experimentation allows the determination of a specific schedule for a particular product. The wheel is then fine-tuned to precise predetermined dimensions, balanced, and examined for defects.

The wheels of the present invention may be of any suitable size depending upon the desired end use. A particularly preferred wheel has a diameter of from about 1 to 30 inches and is of from about 0.05 to 1.25 inches thick. The superabrasive section is generally 0.0625 to 0.25 inch deep and has a thickness the same as the preform core. Alternatively, the superabrasive section may be thinner than the core section of the wheel or be of a graduated thickness defining a sharp cutting edge. In using such wheels, coolants are generally not necessary or employed, although water or a water/oil coolant is often used in finishing operations.

The present invention will now be described with reference to the following Examples and Comparative Examples. All percents and parts are by volume unless otherwise specified.

EXAMPLE 1

A grinding wheel was formed starting with a conventional phenolic-based preform which was squared to a parallel thickness and turned down to a surface textured 4.760"±0.001". The preform was coated with a liquid phenolic cement composition to adhere the superabrasive composition to the preform. The composition was a mixture of 43 g liquid phenolic resin and 7 g long flow powdered phenolic resin in 150 cc methanol.

A superabrasive composition used to form the grinding portion of the wheel was formed by mixing 41.9 g BT 4680, 0.1 g of ferric acetyl acetonate, 0.2 g of dicumyl peroxide, 4.5 g of lime, and 61.2 g of silicon carbide to form the components of the bond mix. BT 4680 is a bismaleimide-triazine resin available from Mitsubishi Gas Chemical Co. and having a glass transition temperature estimated to be above 300° C. and a long term thermal stability estimated to be above 200° C. To 82% by volume of the bond mix was added 18% by volume of 100/120 ANSI mesh cubic boron nitride which had a nickel compound coating. The components were screened through a wire screen with 66 mesh openings (about 0.01") to break up any agglomerates of resin or other bond components before mixing. The screened material was mixed and rescreened. 19.33 grams of this mixture was weighed out for use to form the grinding portion of the wheel.

A conventional grinding wheel mold was used to form the grinding wheel. It was a steel mold and when the mold was assembled the mold cavity had the following dimensions: OD 127.5 mm, ID 120.8 mm, arbor diameter 31.8 mm, and cavity thickness 35.6 mm. After lubricating the mold parts, the cement treated preform was placed over the arbor so that the preform was in the middle thereof and the mold was formed. The mold cavity was blown out with an air hose and the grinding wheel mixture was put into the mold cavity around the preform and leveled while slowly rotating on a turntable. The completed mold assembly was placed in an electric hot hydraulic press at 210° C. and preheated for about 5 minutes. The mold was then brought to 2 tons/-square inch pressure (TSI) for 55 minutes to cure the resin. The mold parts were then disassembled and the pressed wheel allowed to cool.

The wheel was placed into an oven and put through an incremental bake cycle up to a maximum soak temperature of 250° C. for a total period of about 31 hours.

After cooling, the wheel was sided on both sides bringing the thickness down to 0.188 inches. The OD was then faced down to 5.0"±0.005". The wheel was examined for defects.

EXAMPLE 2

A wheel was made in the same manner as the wheel of Example 1 with the following exceptions. The wheel was made with a more concentrated liquid phenolic cement (methanol content of the cement reduced to 38 cc) to improve the rim adhesion of the superabrasive composition to the preform.

EXAMPLE 3

The procedure of Example 1 was repeated to produce an additional wheel of the same composition.

COMPARATIVE EXAMPLE A

The procedure of Example I was repeated to produce a series of wheels wherein the bismaleimide-triazine copolymer resin was replaced by a simple linear bismaleimide resin as in the prior art. Specifically wheels A-1, A-2, and A-3 were each made as in Example 1 with the following exceptions: the BT 4680 BMI resin and the curing system, i.e. dicumyl peroxide and ferric acetyl acetonate were replaced by 4.2 g of MP 256 bismaleimide resin. The resin is a linear simple bismaleimide homopolymer resin made by Mitsubishi Gas Chemical Co. Inc. of Japan. The glass transition and long term thermal resistance are less than 280° C. and 180° C. respectively. No initiator or catalyst is required to polymerize this type of simple homopolymer.

COMPARATIVE EXAMPLE B

The procedure of Example 1 was repeated to produce a series of conventional prior art phenolic bonded superabrasive wheels. Specifically wheels B-1, B-2, and B-3 were each made in accordance with the basic procedure of Example 1 with the variuations indicated. The superabrasive composition of the grinding portion of the wheels was formed from a bond of 40.1 g of screened short flow phenol-formaldehyde resin from Occidental Chemical Corp. containing about 9 wt % hexamethylene tetramine curing agent, 4.3 grams of lime, and 58.9 g of silicon carbide. 79.2 vol % of the above bond and 18 vol % of cubic boron nitride was premixed and screened into a stainless steel bowl. 55 cc of a wetting agent mixture of 96.5 % chloroethane and 3.5% furfural was added. The wetted mixture was stirred and then worked into the abrasive with a pestle. The contents were again screened and the mixture heated for 15 minutes to evaporate the chloroethane. The furfural made up the last 2.8 % of the volume of the wheel. The dried mix was rescreened. 19.12 g of this mix was weighed out for molding purposes.

The superabrasive wheel was molded as in Example 1 except that the incremental bake cycle entailed a maximum temperature of 210° .C and a total period of 37.5 hours.

COMPARATIVE EXAMPLE C

For comparison purposes a wheel using an amine crosslinked bismaleimide homopolymer was prepared as in Example 1 from the following composition:
 Matrimid 5292 bismaleimide resin (52.15 %)
 SiC (29.85 %)
 Cubic boron nitride (18 %)

The crosslinked bismaleimide homopolymer based resin was made up of part A, the bismaleimide homopolymer, and part B, the crosslinking agent diallyl bisphenol-A based system from Ciba-Geigy Corporation. It is not a copolymer as is the resin system of the instant invention. Part B was heated to about 140.C. Part A was then added to and mixed with the heated, liquid part B. This homogenous mixture of A and B was then heated at 140° C. for about 45 minutes at which point the mixture had become a solid. The heating of the mixture at 140° C. for 45 minutes resulted in some crosslinking of the mismaleimide homopolymer by the diallyl bisphenol-A type. This process is commonly referred to as B-staging. The solid partially crosslinked material was pulverized into a fine powder. No catalyst or initiator was used with this bismaleimide polymer. The glass transition temperature of the resin was well below 280° C. and the long term thermal stability was below 180° C.

The composition used to form the grinding portion of the wheel was mixed in the manner described in Comparative Example B. The amount of this abrasive containing composition weighed out for molding use was 19.21 g. The wheel was placed in an oven with an incremental bake cycle and exposed to an incremental bake schedule up to 175° C. over a period of 24 hours.

COMPARATIVE EXAMPLE D For comparison purposes with Comparative Example C, a conventional phenolic bonded wheel as in Comparative Example B was prepared.

The wheels produced above were evaluated for grinding performance. The wheels produced in Examples 1-3 and Comparative Examples A and B were tested at 1, 2, 3 mils of downfeed (0.6, 1.2, and 1.8 cu in/min/in or MRR', respectively.) This is considered to be an extensive longer time-based surface grinding test compared to the grinding tests performed on Comparative Examples C and D which were tested only at 2 mil downfeed (1.2 cu in/min/in of MRR'), i.e. a standard surface grinding test. The results of the above tests are shown in Tables I and III.

TEST CONDITIONS FOR EXAMPLES 1-3 AND COMPARATIVE EXAMPLES A AND B

All wheels were mounted on appropriate arbors, trued and dressed appropriate for a 120 grit abrasive. Wheels mounted on a Brown and Sharpe surface grinder for time based grinding test under the following conditions:
Machine: Brown & Sharpe Surface Grinder
Operation: Traverse Surface Grinding
Wheel Speed: 5000 SFPM (25.4 m/sec)
Work Speed: 600 ipm (25 cm/s)
Unit Downfeed: 1.0, 2.0, 3.0 mils (25, 50, 75 microns)
Total Downfeed/run: 30, 60, 90 mils (0.76, 1.52, 2.28 mm)
Pregrind: 30 mils (0.76 mm)
Coolant: TRIM RD3-78 5%
Material: D3 steel (Rc=50-55) 16×2:406×51 mm

TABLE I

| | Results of Grinding Evaluations | | |
|---|---|---|---|
| Example | Downfeed (in) | G-Ratio | Avg. Power (HP/in) |
| 1 | .001 | 308.9 | 5.26 |
| | .002 | 274.4 | 5.47 |
| | .003 | 271.4 | 5.12 |
| 2 | .001 | 356.6 | 5.39 |
| | .002 | 283.7 | 5.39 |
| | .003 | 249.5 | 5.32 |
| 3 | .001 | 329.3 | 5.01 |
| | .002 | 327.9 | 5.01 |
| | .003 | 265.6 | 5.22 |
| A-1 | .001 | 274.5 | 4.99 |
| | .002 | 184.8 | 5.4 |
| | .003 | 119.0 | 5.4 |
| A-2 | .001 | 283.2 | 4.4 |
| | .002 | 246.7 | 4.74 |
| | .003 | 179.9 | 5.09 |
| A-3 | .001 | 307.0 | 4.19 |
| | .002 | 210.3 | 5.22 |
| | .003 | 147.5 | 4.88 |
| B-1 | .001 | 262.4 | 4.51 |
| | .002 | 207.4 | 5 |
| | .003 | 148.2 | 5.14 |
| B-2 | .001 | 244.5 | 4.38 |
| | .002 | 199.4 | 5.07 |
| | .003 | 175.8 | 4.72 |
| B-3 | .001 | 277.6 | 4.19 |
| | .002 | 202.8 | 5.17 |
| | .003 | 167.1 | 5.03 |

From a review of Table I it is quite clear that the bismaleimide-triazine copolymer resin bonded superabrasive wheels of this invention exhibit superior G ratios compared to the prior art phenolic wheels (Comparative Example B) at 1, 2, and 3 mils of downfeed (a broad range of material removal rates). The G Ratio is defined as the material removal rate (MRR') divided by the wheel wear rate (WWR). When the G ratios and power values of the wheels of the invention and the prior artwheels were subjected to a statistical analysis ("t test"), with 95% confidence limits, the G ratios at 1 mil downfeed show the present invention to be at least 10% superior, at 2 mil downfeed at least 20% superior, and at 3 mil downfeed at least 40% superior. Also at a 1 mil downfeed, the power requirement for the wheels of this invention was about 10% higher although at other downfeed rates no substantial power difference was noted. In all cases, the finishes produced failed to show any differences.

The arithmatic averages of G ratios and power values were computed and are given in Table II for the wheels of the present invention vs. Comparative Examples A and B.

TABLE II

| Arithmatic averages of G ratios and power values | | | |
|---|---|---|---|
| Example | Downfeed (in.) | G-Ratio | Avg. Power (HP/in) |
| Invention | .001 | 332 | 5.2 |
| | .002 | 295 | 5.3 |
| | .003 | 262 | 5.2 |
| Comparative A | .001 | 288 | 4.5 |
| | .002 | 214 | 5.1 |
| | .003 | 114 | 5.1 |
| Comparative B | .001 | 262 | 4.4 |
| | .002 | 203 | 5.1 |
| | .003 | 164 | 5.0 |

From the above test results and conclusions it is evident that superabrasive cutting wheels bonded with a bismaleimide triazine polymer are superior in overall performance compared to both prior art phenolic bonded superabrasive wheels and linear bismaleimide polymer-bonded wheels.

TEST CONDITIONS FOR COMPARATIVE EXAMPLES C AND D

All wheels were mounted on appropriate arbors, trued and dressed appropriate for a 120 grit abrasive. Wheels mounted on the Brown and Sharpe surface grinder for 2 mil surface grinding test.
Machine: Brown & Sharpe Surface Grinder
Wheel Speed: 5000 SFPM (25.4 m/sec)
Table Traverse: 600 in/min (15.2 m/min)
Unit Downfeed: 2.0 mil (50.8 microns)
Total Downfeed: 30 mils (0.76 mm)
Pregrind 30 mils mm) (0.76 mm)
Coolant: TRM UHP E300
Material: D3 steel (Rc=50-55), 16×2: 406×51 mm.

TABLE III

| | Results of Grinding Evaluations | | |
|---|---|---|---|
| Example | Downfeed (in) | G-Ratio | Avg. Power (watts) |
| C | .002 | 107.6 | 196 |
| D | .002 | 276.46 | 268 |

The results of Table III clearly indicate that a crosslinked bismaleimide homopolymer bonded wheel (Comparative Example C) was far inferior to even the prior art phenolic bonded wheels. Thus, such wheels must be substantially inferior to the wheels of the present invention.

What is claimed is:

1. An abrasive composition which comprises a superabrasive material, a bismaleimide-triazine addition copolymer resin which as a cured polymer exhibits (i) a glass transition temperature (Tg) of at least about 280° C. and (ii) a long term thermal resistance of at least about 180° C., and a free radical generating initiator.

2. The composition of claim 1, wherein the superabrasive has a Knoop hardness of at least about 3000 kg/mm$^2$.

3. The abrasive composition of claim 1, wherein the superabrasive material is selected from the group consisting of diamond, cubic boron nitride, and mixtures thereof.

4. The abrasive composition of claim 3, wherein the superabrasive material is metal coated.

5. The abrasive composition of claim 4, wherein the coating is nickel.

6. The abrasive composition of claim 3, additionally containing a secondary abrasive.

7. The abrasive composition of claim 6, wherein the secondary abrasive is a sintered alumina.

8. The abrasive composition of claim 1, wherein the superabrasive material is present in an amount of from about 5 to 40% by volume of he composition.

9. The abrasive composition of claim 1, wherein the bismaleimide-triazine resin is present in an amount of from about 35 to 60% by volume of the composition.

10. The abrasive composition of claim 9, wherein the bismaleimide-triazine resin is present in an amount of from about 45 to 55% by volume.

11. The abrasive composition of claim 1, wherein the initiator is selected from the group consisting of peroxide and azo initiators.

12. The abrasive composition of claim 10, wherein the peroxide is selected from the group consisting o dicumyl peroxide.

13. The abrasive composition of claim 1, wherein the composition further includes a catalyst for accelerating the curing of the resin.

14. The abrasive composition of claim 13, wherein the catalyst is selected from the group consisting of an organic metal salt, an amine, or a combination thereof.

15. The abrasive composition of claim 14, wherein the catalyst is an organic metal salt selected from the group consisting of zinc octoate and ferric acetyl acetonate.

16. The abrasive composition of claim 14, wherein the catalyst is an amine selected from the group consisting of triethylene diamine, and N,N-dimethylbenzylamine.

17. The abrasive composition of claim 1, additionally containing a filler material.

18. The abrasive composition of claim 16, wherein the filler material is selected from the group consisting of polytetrafluoroethylene, silicon carbide, graphite, and molybdenum disulphide.

19. The abrasive composition of claim 17, wherein the filler material is present in an amount of from about 20 to 40% by volume of the composition.

20. The abrasive composition of claim 17 wherein the filler material is a secondary abrasive.

21. The abrasive composition of claim 20, wherein the secondary abrasive is a sintered alumina.

22. The abrasive composition of claim 1, additionally containing a material for absorbing water.

23. The abrasive composition of claim 22, wherein the water-absorbing material is lime.

24. The abrasive composition of claim 23, wherein the lime is present in an amount of from about 1 to 5% by volume of the composition.

25. An abrasive composition comprising a superabrasive selected from either diamond or cubic boron nitride, a bismaleimide-triazine addition copolymer resin, a free-radical generating initiator, a catalyst for curing said resin, and a filler.

26. The abrasive composition of claim 25, wherein the superabrasive material is present in an amount of from about 5 to 40% by volume of the composition, the bismaleimide-triazine resin is present in an amount of from about 35 to 60% by volume, the initiator is present in an amount of from about 0.01 to 1% by weight of the resin, the catalyst is present in an amount of about 0.01 to 1% by weight of the resin, and the filler is present in an amount of from about 20 to 40 % by volume.

27. The abrasive composition of claim 25, wherein the superabrasive material is present in an amount of from about 10 to 25% by volume of the composition, the bismaleimide-triazine resin is present in an amount of from about 45 to 55% by volume, the initiator is a peroxide, the catalyst is an organic metal salt, and the filler is present in an amount of from about 25 to 35% by volume.

28. A cutting wheel having an inner core section and an outer annular cutting edge section, said cutting edge being composed of the abrasive composition of claim 1.

29. A cutting wheel having an inner core portion and an outer annular cutting edge portion, said cutting edge portion being composed of the abrasive composition of claim 25.

30. A grinding wheel having an inner core section and an outer annular grinding section, said grinding section being composed of the abrasive composition of claim 1.

31. A grinding wheel having an inner core portion and an outer annular grinding section, said grinding section being composed of the abrasive composition of claim 25.

* * * * *